United States Patent [19]

Noel

[11] Patent Number: 5,461,891
[45] Date of Patent: Oct. 31, 1995

[54] APPARATUS FOR SECURE POSITIONING OVER AND AROUND A STEERING WHEEL AND STEERING COLUMN TO PREVENT THEFT

[76] Inventor: Jean L. Noel, 168 Clinton Ave., Apt. #13, Jersey City, N.J. 07304

[21] Appl. No.: 239,463

[22] Filed: May 9, 1994

[51] Int. Cl.$^6$ ..................................................... E05B 73/00
[52] U.S. Cl. .................................. 70/18; 70/237; 70/417; 70/428; 70/209
[58] Field of Search .................................... 70/14, 15, 18, 70/237, 238, 252, 416, 417, 423, 424, 427, 428, 455, 209, 212, 226

[56] References Cited

U.S. PATENT DOCUMENTS

| | | | |
|---|---|---|---|
| 3,401,543 | 9/1968 | Lewis | 70/226 X |
| 3,738,137 | 6/1973 | Jones | 70/428 |
| 3,811,303 | 5/1974 | Robertson | 70/18 X |
| 4,020,662 | 5/1977 | Fowler | 70/18 X |
| 4,516,414 | 5/1985 | Woolvin . | |
| 4,719,986 | 1/1988 | Richardson, Jr. | 70/417 X |
| 4,955,215 | 9/1990 | Eremita | 70/18 |
| 5,113,674 | 5/1992 | LiCausi | 70/18 X |
| 5,119,651 | 6/1992 | Yang | 70/238 X |
| 5,275,030 | 1/1994 | Cole | 70/226 X |

Primary Examiner—Peter M. Cuomo
Assistant Examiner—Suzanne L. Dino

[57] ABSTRACT

An apparatus for secure positioning over and around a steering wheel and steering column to prevent theft. The apparatus comprises a plate positionable over the top of a central part of a steering wheel having a steering column with laterally extending rods for turn signals and the like. The plate has a short post extending downwardly from one edge thereof with an upper end pivotally secured about an axis with respect to the plate and with the lower end having an inwardly projecting leg. The plate also has a long post which extends downwardly from a second edge of the plate diametrically opposite from the first edge with an upper end pivotally secured about an axis with respect to the plate about an axis parallel with the first axis and with a lower end having an outwardly projecting leg. The apparatus further includes a first housing half and a second housing half positionable around the steering column beneath the steering wheel. The first and second housing halves having inner walls and outer walls and planar linear walls therebetween with parallel upper and lower faces. The upper faces have a recess for the removable receipt of the outwardly projecting leg. The upper face of the first housing half is closer to the plate than the upper face of the second housing half. The apparatus further includes means to rotatably couple the first and second housing halves.

5 Claims, 5 Drawing Sheets

APPARATUS FOR SECURE POSITIONING OVER AND AROUND A STEERING WHEEL AND STEERING COLUMN TO PREVENT THEFT

BACKGROUND OF THE INVENTION

1. Field of the Invention

The present invention relates to apparatus for secure positioning over and around a steering wheel and steering column to prevent theft and more particularly pertains to preventing the theft of a vehicle by positioning a device securely over and around a steering wheel and column.

2. Description of the Prior Art

The use of devices to discourage the theft of vehicles is known in the prior art. More specifically, devices to discourage the theft of vehicles heretofore devised and utilized for the purpose of to minimize the possibility of theft or unauthorized use of cars and trucks are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 276,888 to Jaeger discloses a guard link for use in association with a steering wheel column lock.

U.S. Pat. No. 4,696,173 to Lee discloses a vehicle steering wheel and shift lever guard.

U.S. Pat. No. 5,092,146 to Wang discloses a steering wheel lock.

U.S. Pat. No. 5,138,853 to Chen discloses an antitheft lock for a vehicle.

Lastly, U.S. Pat. No. 5,168,732 to Chen et al discloses an automobile steering lock.

In this respect, the apparatus for secure positioning over and around a steering wheel and steering column to prevent theft according to the present invention substantially departs from the conventional concepts and designs of the prior art, and in doing so provides an apparatus primarily developed for the purpose of preventing the theft of a vehicle by positioning a device securely over and around a steering wheel and column.

Therefore, it can be appreciated that there exists a continuing need for new and improved apparatus for secure positioning over and around a steering wheel and steering column to prevent theft which can be used for preventing the theft of a vehicle by positioning a device securely over and around a steering wheel and column. In this regard, the present invention substantially fulfills this need.

SUMMARY OF THE INVENTION

In view of the foregoing disadvantages inherent in the known types of devices to discourage the theft of vehicles now present in the prior art, the present invention provides an improved apparatus for secure positioning over and around a steering wheel and steering column to prevent theft. As such, the general purpose of the present invention, which will be described subsequently in greater detail, is to provide a new and improved apparatus for secure positioning over and around a steering wheel and steering column to prevent theft and method which has all the advantages of the prior art and none of the disadvantages.

To attain this, the present invention essentially comprises an apparatus for secure positioning over and around a steering wheel and steering column to prevent theft comprising a plate positionable over the top of a central part of a steering wheel of the type having a steering column with laterally extending rods for turn signals and the like, the plate having a short post extending downwardly from one edge thereof with an upper end pivotally secured about an axis with respect to the plate and with the lower end having an inwardly projecting leg, and having a long post extending downwardly from a second edge of the plate diametrically opposite from the first edge with an upper end pivotally secured about an axis with respect to the plate about an axis parallel with the first axis and with a lower end having an outwardly projecting leg. The apparatus further including a first housing half positionable around a first half of a steering column beneath a steering wheel, the first housing half having an inner wall and an outer wall and a curved intermediate wall therebetween and with parallel upper and lower faces, the upper face having an aperture for the removable receipt of the inwardly projecting leg. The apparatus further including a second housing half positionable around a second half of a steering column beneath a steering wheel, the second housing half having an inner wall and an outer wall and a planar linear wall therebetween with parallel upper and lower faces, the upper face having a recess for the removable receipt of the outwardly projecting leg, the upper face of the first housing half being closer to the plate than the upper face of the second housing half to define a lateral opening. The apparatus further including a hinge rotatable about an axis perpendicular to the axes of the posts, one end of the hinge being coupled to one edge of the second housing half and a pivot plate coupled to the other end of the hinge, the pivot plate having a slot and a projection extending outwardly from the first housing half adjacent to the edge proximate the hinge whereby the first housing half may be coupled to the pivot plate for pivotal motion with respect to the second housing half. The apparatus further including a pair of radially extending tabs each with a hole therethrough, each tab secured to an associated housing half at edges thereof remote from the hinge. The apparatus further including a pad lock positionable through the holes of the tabs to couple together the first housing half and second housing half and plate to preclude operation of the steering wheel and column enclosed thereby for preventing theft.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved apparatus for secure positioning over and around a steering wheel and steering column to prevent theft which have all the advantages of the prior art devices to discourage the theft of vehicles and none of the disadvantages.

It is another object of the present invention to provide new and improved apparatus for secure positioning over and around a steering wheel and steering column to prevent theft which may be easily and efficiently manufactured and marketed.

It is a further object of the present invention to provide new and improved apparatus for secure positioning over and around a steering wheel and steering column to prevent theft which are of durable and reliable constructions.

An even further object of the present invention is to provide new and improved apparatus for secure positioning over and around a steering wheel and steering column to prevent theft which are susceptible of a low cost of manufacture with regard to both materials and labor, and which accordingly are then susceptible of low prices of sale to the consuming public, thereby making such apparatus for secure positioning over and around a steering wheel and steering column to prevent theft economically available to the buying public.

Still yet another object of the present invention is to provide new and improved apparatus for secure positioning over and around a steering wheel and steering column to prevent theft which provide in the apparatuses and methods of the prior art some of the advantages thereof, while simultaneously overcoming some of the disadvantages normally associated therewith.

Even still another object of the present invention is to prevent the theft of a vehicle by positioning a device securely over and around a steering wheel and column.

Lastly, it is an object of the present invention to provide a new and improved apparatus for secure positioning over and around a steering wheel and steering column to prevent theft comprising a plate positionable over the top of a central part of a steering wheel of the type having a steering column with laterally extending rods for turn signals and the like, the plate having a short post extending downwardly from one edge thereof with an upper end pivotally secured about an axis with respect to the plate and with the lower end having an inwardly projecting leg, and having a long post extending downwardly from a second edge of the plate diametrically opposite from the first edge with an upper end pivotally secured about an axis with respect to the plate about an axis parallel with the first axis and with a lower end having an outwardly projecting leg. The apparatus further including a first housing half positionable around a first half of a steering column beneath a steering wheel, the first housing half having an inner wall and an outer wall and a curved intermediate wall therebetween and with parallel upper and lower faces, the upper face having an aperture for the removable receipt of the inwardly projecting leg. The apparatus further including a second housing half positionable around a second half of a steering column beneath a steering wheel, the second housing half having an inner wall and an outer wall and a planar linear wall therebetween with parallel upper and lower faces, the upper face having a recess for the removable receipt of the outwardly projecting leg, the upper face of the first housing half being closer to the plate than the upper face of the second housing half to define a lateral opening. The apparatus further including means to rotatably couple the first and second housing halves.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
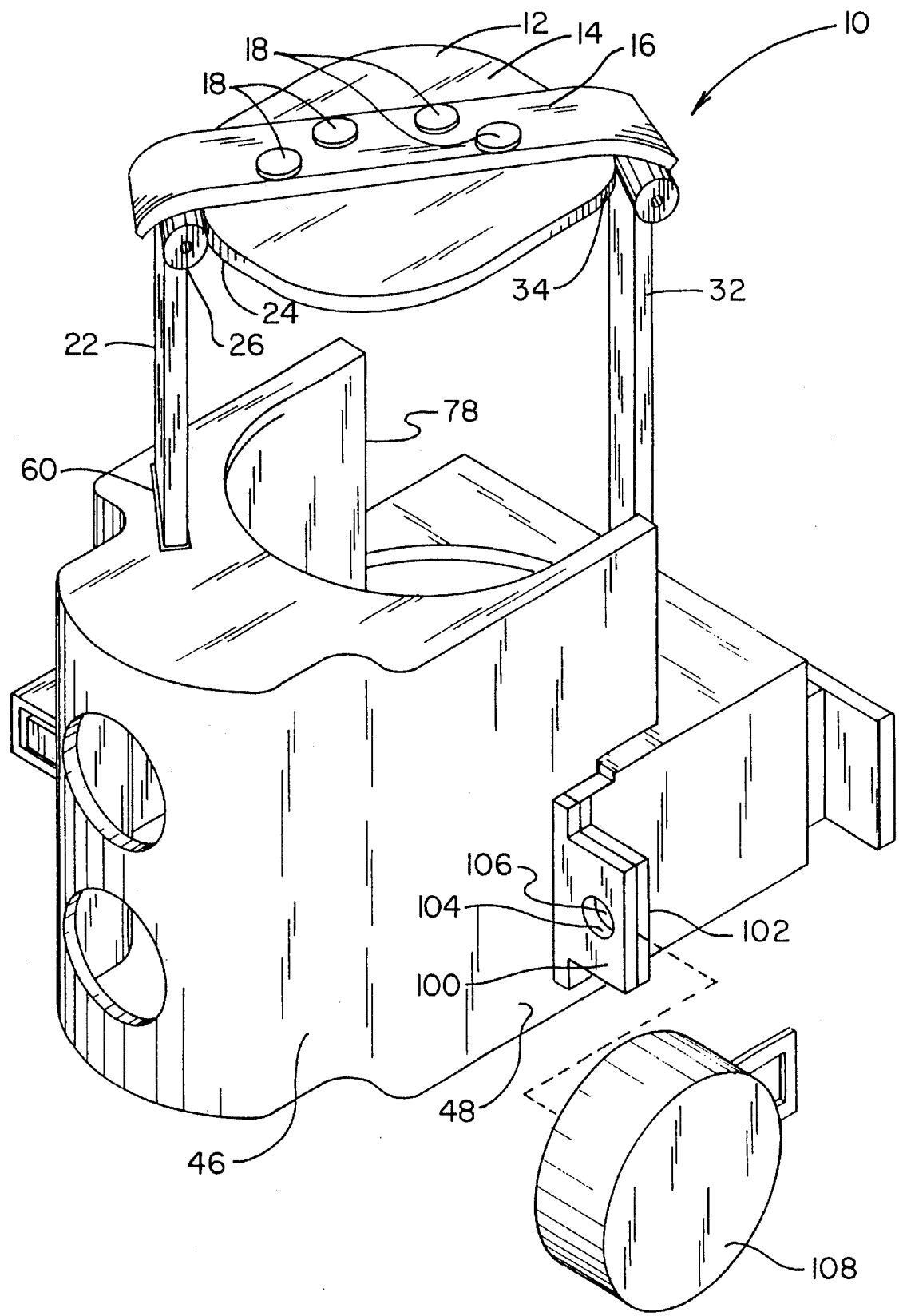
FIG. 1 is a perspective illustration of the preferred embodiment of the apparatus for secure positioning over and around a steering wheel and steering column to prevent theft constructed in accordance with the principles of the present invention.
Figure 2:
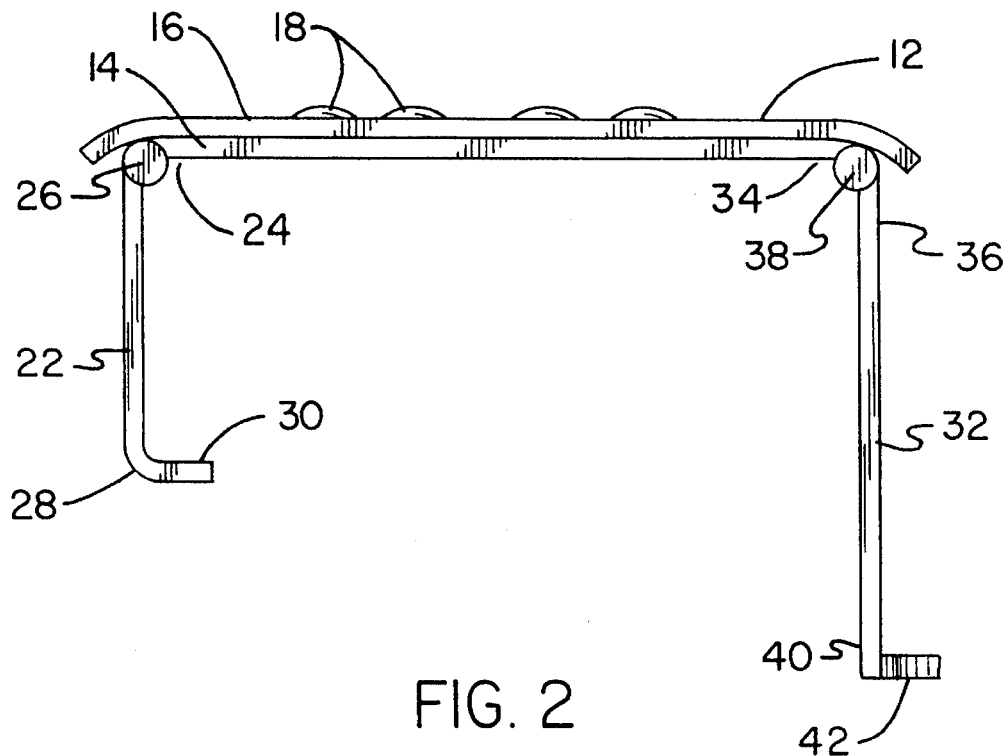
FIG. 2 is a side elevational view of the plate illustrated in FIG. 1.
Figure 3:
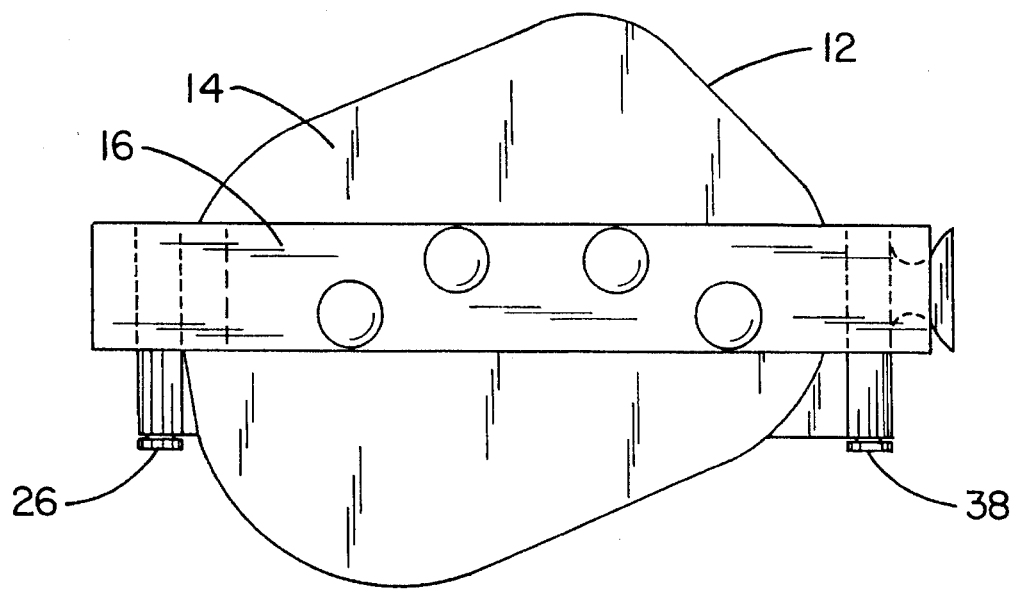
FIG. 3 is a top plan view of the plate illustrated in FIGS. 1 and 2.
Figure 4:
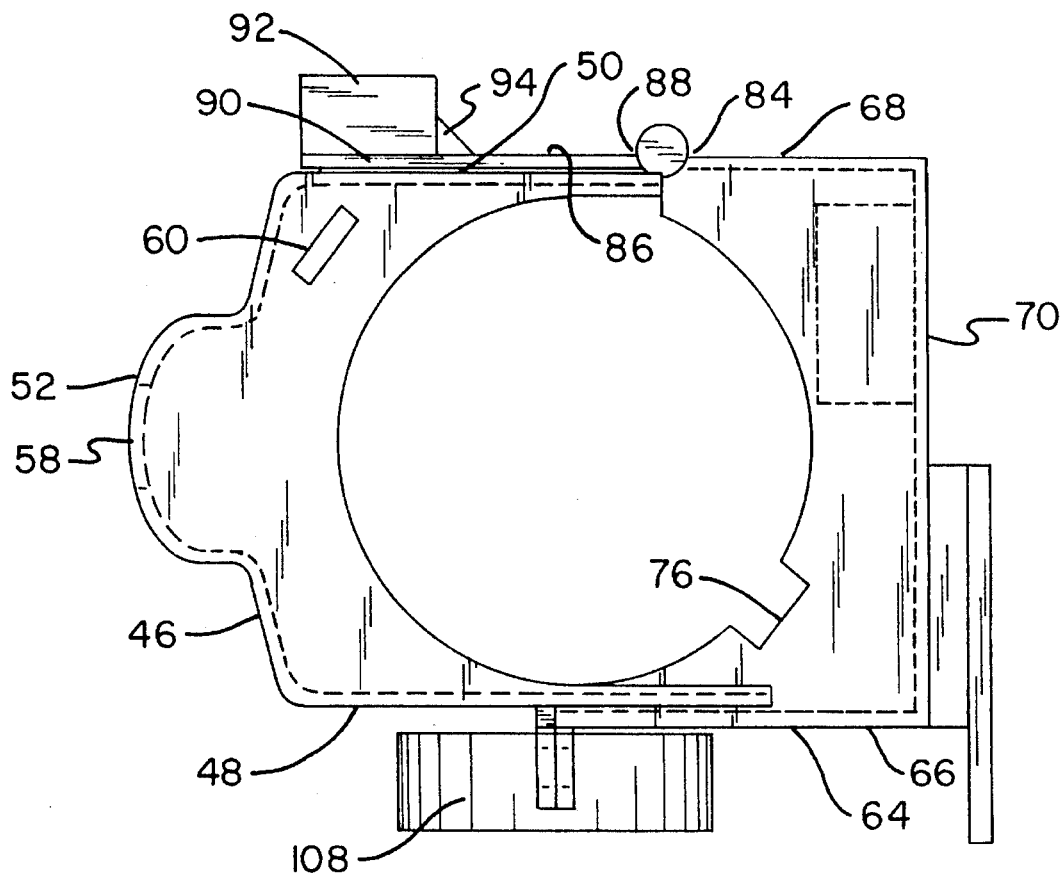
FIG. 4 is a top plan view of the first and second housing halves coupled together during operation and use with the plate removed.
Figure 5:
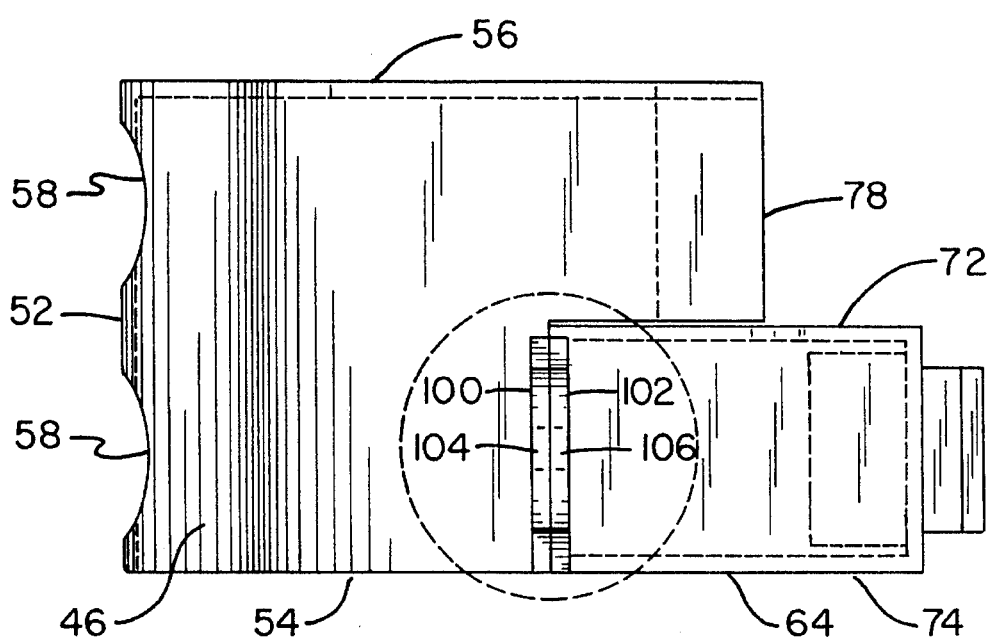
FIG. 5 is a side elevational view of the first and second housing halves illustrated in FIG. 4.
Figure 6:
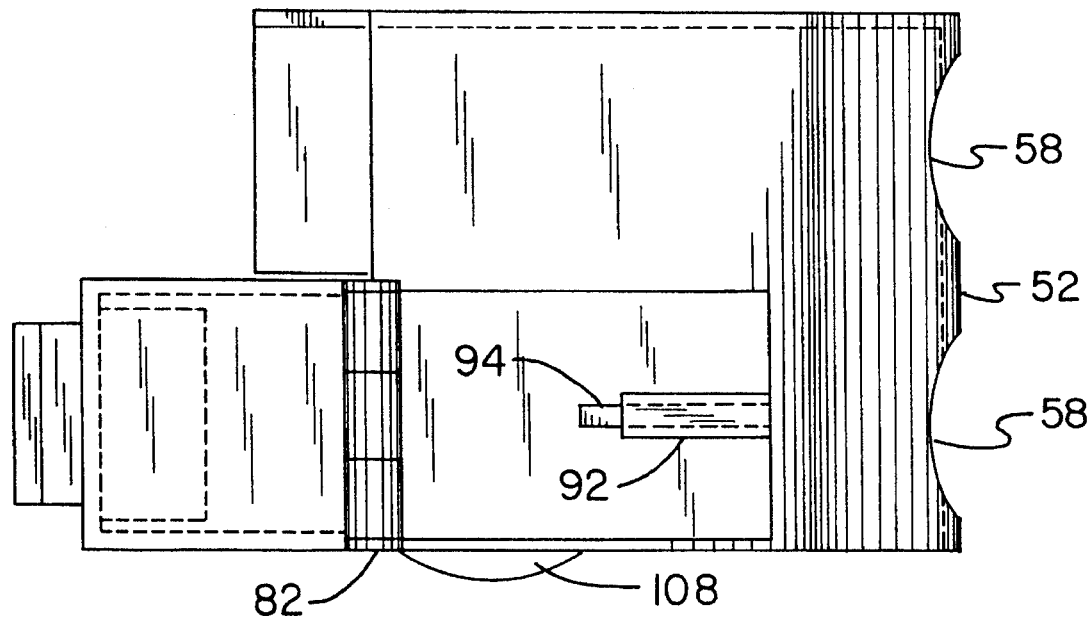
FIG. 6 is a side elevational view similar to FIG. 5 but taken from the opposite side thereof.
Figure 7:
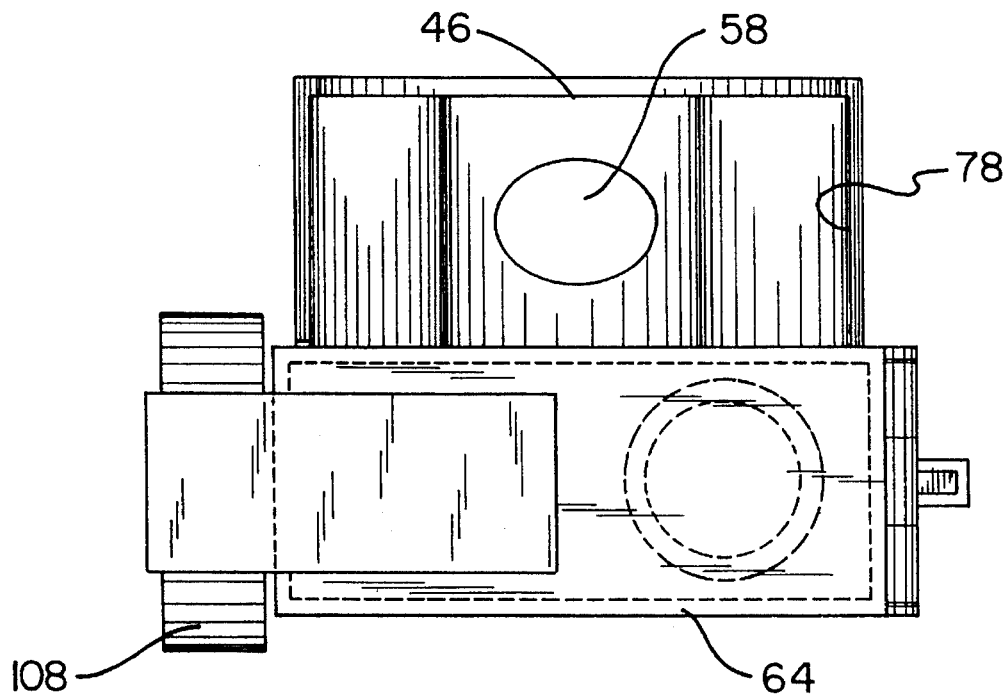
FIG. 7 is a front elevational view of the housing halves coupled together as shown in FIGS. 5 and 6.
Figure 8:
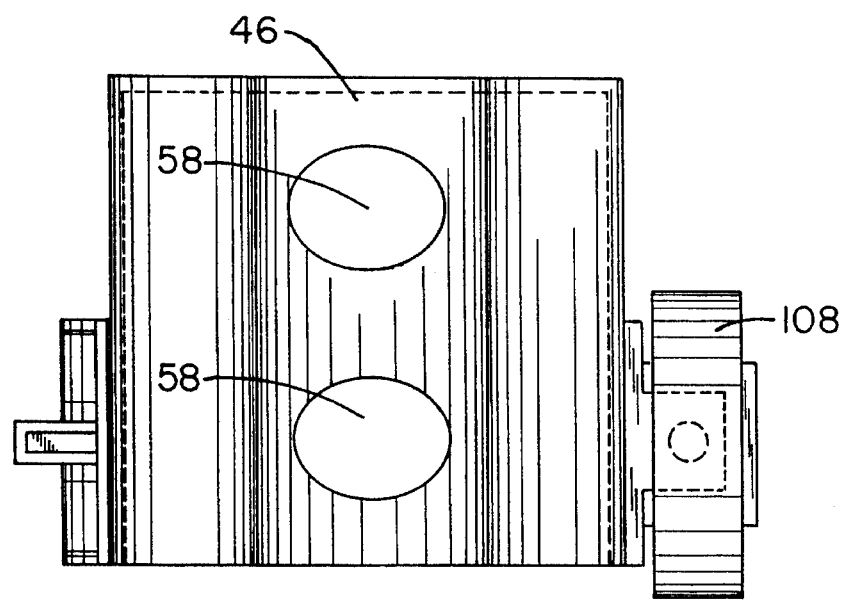
FIG. 8 is a rear elevational view similar to FIG. 7 but taken from the opposite side thereof.
Figure 9:
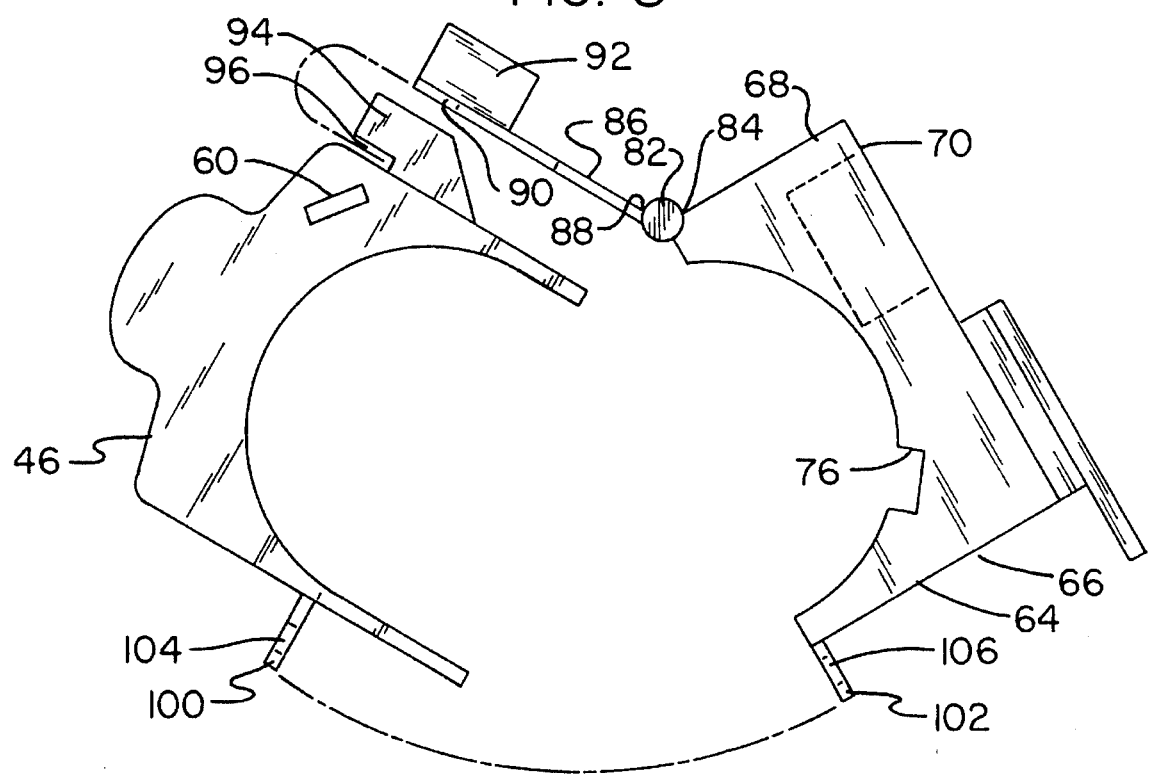
FIG. 9 is a top plan view of the first and second housing halves but shown in the open orientation.

With reference now to the drawings, and in particular to FIG. 1 thereof, the preferred embodiment of the new and improved apparatus for secure positioning over and around a steering wheel and steering column to prevent theft embodying the principles and concepts of the present invention and generally designated by the reference numeral 10 will be described.

The present invention, the new and improved apparatus for secure positioning over and around a steering wheel and steering column to prevent theft is comprised of a plurality of components. In their broadest context, such components include a plate, a first housing half, a second housing half, a hinge, tabs and a pad lock. Such components are individually configured and correlated with respect to each other so as to attain the desired objective.

More specifically, with reference to the Figures, there is shown a system 10 whose central component is a plate 12. The plate is adapted to be positioned over the central upper part of a steering wheel. The vehicle, whether a car, truck or the like, is the type having a steering wheel with a steering column therebeneath. Such steering columns normally have laterally extending rods as for turn signals and in some cases, wind-shield wipers or gear shifts and the like. The plate includes a central section 14 and a rigid metallic strap 16 secured thereto as by rivets 18.

In association with the plate are a pair of posts. The posts include a first or short post 22. Such short post extends downwardly from the first edge 24 of the plate, preferably secured to the rigid transverse member. The upper edge of the post is pivoted through a hinge 26 about an axis of rotation with respect to the plate. The lower end 28 of the plate has an inwardly projecting leg 30. In addition, the plate has a long post 32. Like the short post, the long post extends downwardly from a second edge 34 of the plate. The second edge is diametrically opposite from the first edge. The long post has an upper end 36 pivotally secured about an axis with respect to the plate through as hinge 38. The axis of rotation of the two hinges are parallel with each other. The long post has a lower end 40 formed with an outwardly projecting leg 42. The purposes of the legs will be described hereinafter.

Next provided is a housing positionable around the steering column beneath the steering wheel. The housing is formed of a first housing half 46. The first housing half is positionable around the elongated extent of the first half the steering column beneath the steering wheel and beneath the plate. The first housing half has an inner wall 48, an outer wall 50 and a curved intermediate wall 52 therebetween. It also has a lower face 54 and an upper face 56 which are parallel with respect to each other. A space is thus formed in the first housing half to one side of the steering wheel. Apertures 58 are formed at a central extent of the intermediate wall for the passage of rods such as turn signals, wind shield wipers and the like. In addition, the upper face has an aperture 60 for the removable receipt of the inwardly projecting leg. This is to effect the coupling therebetween during operation and use.

The next component of the system 10 is a second housing half 64. The second housing half is adapted to be positioned around the second half of a steering column beneath the steering wheel and adjacent to the first housing half. The second housing half is formed with an inner wall 66, an outer wall 68 and a planar linear wall 70 therebetween. The second housing half also has parallel upper and lower faces 72 and 74. The upper face is formed with a recess 76 for the removable receipt of the outwardly projecting leg. In addition, the upper face of the first housing half is located closer to the plate than the upper face of the second housing half. This is to define a lateral opening 78 as may be required for the passage of a rod for constituting a gear shift from the steering column to which the first and second housing halves are coupled.

Coupling between the first and second housing halves is through a hinge 82. The hinge is rotatable about an axis perpendicular to the axes of the posts. One end 84 of the hinge is coupled to one adjacent edge of the second housing half. A pivot plate 86 is coupled to the other edge 88 of the hinge. The pivot plate is formed with a slot 90. The slot has a guard plate 92 located thereabove. In association therewith, a projection 94 with a recess 96 extends outwardly from the first hinge half. This is located adjacent to the edge proximate to the hinge. In this manner, the first hinge half may be coupled to the pivot plate by moving the projection through the slot for thereby effecting the coupling of the first and second housing halves.

Final securement of the hinge halves and plate with respect to the steering column and wheel is effected through a pair of radially extending tabs 100 and 102. A hole 104 and 106 extends through each tab to be in axial alignment one with respect to the other. The tabs are secured with respect to the first housing half and to the second housing half at the edges thereof remote from the hinge. Lastly, a pad lock 108 is positioned over the tabs with a portion through the holes of the tabs. This is to couple together in a locked manner the first and second housing halves and plate. When so locked, the pad-lock functions to preclude operation of the steering wheel and column enclosed thereby. Theft of the vehicle upon which the steering wheel and steering column are located is thereby precluded.

The present invention is an innovative automobile theft prevention device. It is a passive system that prevents a would-be thief from using the steering wheel. Conventional external steering wheel locking devices have the shortcoming that they can be removed with a small amount of work. They can be defeated by cutting through the steering wheel, removing the steering wheel, or by freezing the shaft and striking it with a hammer. This invention cannot be removed by the aforementioned methods, making it very difficult to steel the vehicle.

This theft prevention system locks onto the front of the steering wheel, over the center hub. Positioning in this manner prevents access to the bolts that hold the steering wheel in place. It clamps over the steering wheel and onto the steering column, making it impossible to steer the vehicle. The present invention is made from hardened steel which makes cutting through it a time consuming and difficult task. A bright red or orange finish is applied to the surface to indicate its presence. This enhances the unit in its initial objective of deterring a thief.

This invention is clearly superior to conventional automobile theft prevention devices. It can be easily installed by the do-it-yourselfer who possesses average mechanical skills. This lock system works equally well on all types and makes of cars, an can be produced for truck use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved apparatus for secure positioning over and around a steering wheel and steering column to prevent theft comprising, in combination:

a plate positionable over the top of a central part of a steering wheel of the type having a steering column with laterally extending rods for turn signals, the plate having a short post extending downwardly from one edge thereof with an upper end pivotally secured about an axis with respect to the plate and with the lower end having an inwardly projecting leg, and having a long post extending downwardly from a second edge of the plate diametrically opposite from the first edge with an upper end pivotally secured about an axis with respect to the plate about an axis parallel with the first axis and with a lower end having an outwardly projecting leg;

a first housing half positionable around a first half of a steering column beneath a steering wheel, the first housing half having an inner wall and an outer wall and a curved intermediate wall therebetween and with parallel upper and lower faces, the upper face having an aperture for the removable receipt of the inwardly projecting leg;

a second housing half positionable around a second half of a steering column beneath a steering wheel, the second housing half having an inner wall and an outer wall and a planar linear wall therebetween with parallel upper and lower faces, the upper face having a recess for the removable receipt of the outwardly projecting leg, the upper face of the first housing half being closer to the plate than the upper face of the second housing half to define a lateral opening;

a hinge rotatable about an axis perpendicular to the axes of the posts, one end of the hinge being coupled to one edge of the second housing half and a pivot plate coupled to the other end of the hinge, the pivot plate having a slot and, a projection extending outwardly from the first housing half adjacent to the edge proximate the hinge whereby the first housing half may be coupled to the pivot plate for pivotal motion with respect to the second housing half;

a pair of radially extending tabs each with a hole therethrough, each tab secured to an associated housing half at edges thereof remote from the hinge; and a pad lock positionable through the holes of the tabs to couple together the first housing half and second housing half and plate to preclude operation of the steering wheel and column enclosed thereby for preventing theft.

2. An apparatus for secure positioning over and around a steering wheel and steering column to prevent theft comprising:

a plate positionable over the top of a central part of a steering wheel of the type having a steering column with laterally extending rods for turn signals, the plate having a short post extending downwardly from one edge thereof with an upper end pivotally secured about an axis with respect to the plate and with the lower end having an inwardly projecting leg, and having a long post extending downwardly from a second edge of the plate diametrically opposite from the first edge with an upper end pivotally secured about an axis with respect to the plate about an axis parallel with the first axis and with a lower end having an outwardly projecting leg;

a first housing half positionable around a first half of a steering column beneath a steering wheel, the first housing half having an inner wall and an outer wall and a curved intermediate wall therebetween and with parallel upper and lower faces, the upper face having an aperture for the removable receipt of the inwardly projecting leg;

a second housing half positionable around a second half of a steering column beneath a steering wheel, the second housing half having an inner wall and an outer wall and a planar linear wall therebetween with parallel upper and lower faces, the upper face having a recess for the removable receipt of the outwardly projecting leg, the upper face of the first housing half being closer to the plate than the upper face of the second housing half to define a lateral opening; and means to rotatably couple the first and second housing halves.

3. The apparatus as set forth in claim 2 wherein the hinge means includes a hinge rotatable about an axis perpendicular to the axes of the posts, one end of the hinge being coupled to one edge of the second housing half and a pivot plate coupled to the other end of the hinge, the pivot plate having a slot and a projection extending outwardly from the first housing half adjacent to the edge proximate the hinge whereby the first housing half may be coupled to the pivot plate for pivotal motion with respect to the second housing half.

4. The apparatus as set forth in claim 3 and further including:

a pair of radially extending tabs each with a hole therethrough, each tab secured to an associated housing half at edges thereof remote from the hinge.

5. The apparatus as set forth in claim 4 and further including:

a pad lock positionable through the holes of the tabs to couple together the first housing half and second housing half and plate to preclude operation of the steering wheel and column enclosed thereby for preventing theft.

* * * * *